April 14, 1942.  V. M. POSADA  2,279,412
MICROSCOPIC CARRIAGE
Filed Oct. 17, 1939  2 Sheets-Sheet 1

Victor M. Posada,
INVENTOR

BY Victor J. Evans & Co.
ATTORNEYS

April 14, 1942.   V. M. POSADA   2,279,412
MICROSCOPIC CARRIAGE
Filed Oct. 17, 1939   2 Sheets-Sheet 2
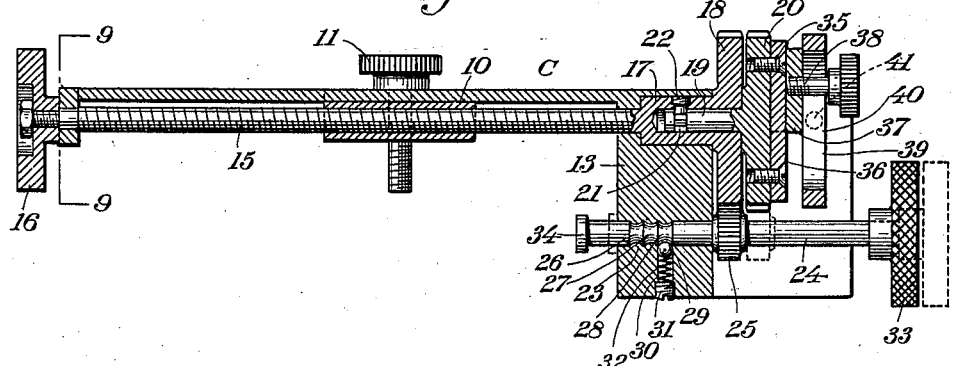
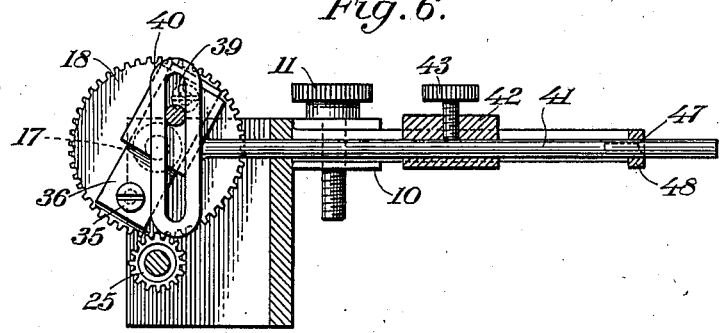
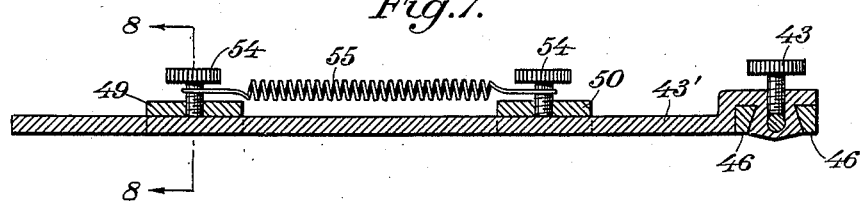
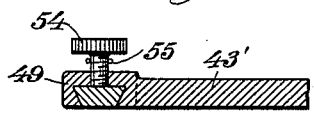
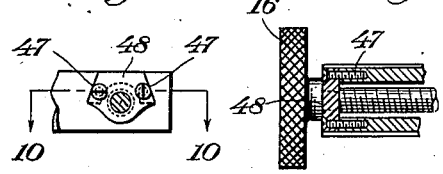
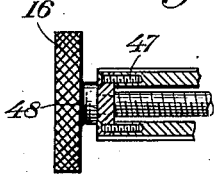
Victor M. Posada,
INVENTOR Patented Apr. 14, 1942

2,279,412

UNITED STATES PATENT OFFICE 2,279,412

MICROSCOPIC CARRIAGE

Victor M. Posada, San Salvador, El Salvador

Application October 17, 1939, Serial No. 299,886

3 Claims. (Cl. 88—40)

My invention relates to an attachment for microscopes and comprehends a novel form of carriage or holder for movement with respect to the lens of the microscope.

One of the principal objects of my invention is to provide a specimen carriage or holder for attachment to a microscope and which is equipped with means for imparting lateral and longitudinal movements to the carriage with respect to the lens of the microscope to permit a careful study and observation of the specimen contained on said carriage or holder.

Another object of my invention is to provide a device of the above described character equipped with means whereby the path of movement may be limited to an area equal to that defined by the size of the specimen or that part of the specimen to be studied and observed.

An important object of my invention is to provide a device of the above described character capable of being attached to microscopes already in use without modifying the same.

A special object of my invention is to provide a device of the above described character equipped with means adjustable for imparting a zig-zag movement to the specimen with respect to the lens of the microscope and in a manner to confine the path of travel of the specimen within an area approximately equal to that defined by the size of the specimen.

A further object of my invention is to provide a device of the above described character which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 5 is a detail sectional view taken on the line 5—5 of Figure 3.

Figure 6 is a detail sectional view taken on the line 6—6 of Figure 3.

Figure 7 is a detail sectional view taken on the line 7—7 of Figure 3.

Figure 8 is a detail sectional view taken on the line 8—8 of Figure 7.

Figure 9 is a detail sectional view taken on the line 9—9 of Figure 5.

Figure 10 is a detail sectional view taken on the line 10—10 of Figure 9.

In teaching my invention I employ a microscope 5 of ordinary construction and which is equipped with the usual specimen slide supporting shelf 6 to which I secure my invention, namely, a carriage or holder C for moving the specimen frame or slide in various directions under and with respect to the lens 7 of said microscope whereby the specimen may be examined and studied.

Figure 1:
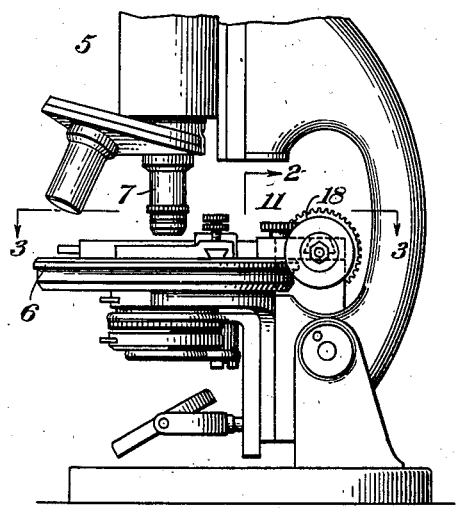
Figure 1 is a side elevation of a microscope equipped with my invention.
Figure 2:
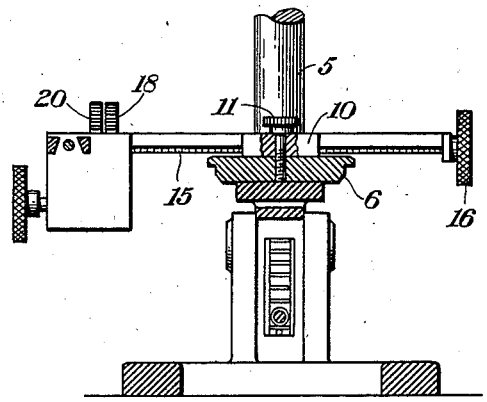
Figure 2 is a vertical sectional view taken on the line 2—2 of Figure 1.
Figure 3:
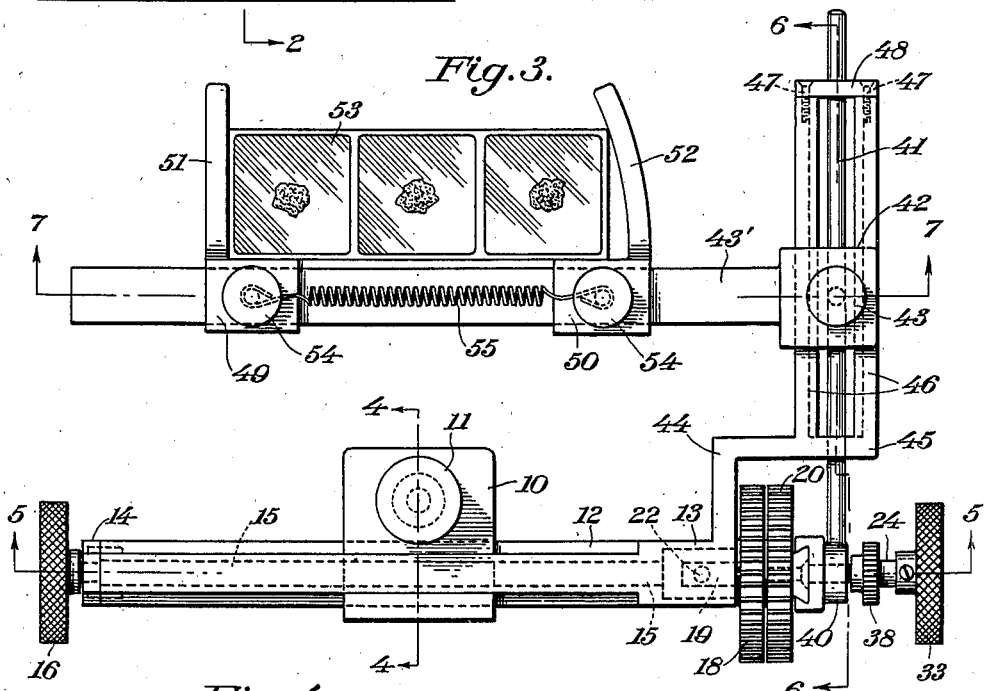
Figure 3 is a plan view of my invention on an enlarged scale taken on the plane of the line 3—3 of Figure 1.
Figure 4:
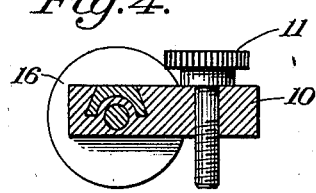
Figure 4 is a detail sectional view taken on the line 4—4 of Figure 3.

My novel form of carriage or holder C comprises, in detail, a plate 10 detachably fixed to the shelf 6 by means of a set screw 11 carried by the plate. The plate has slidably mounted therein an elongated slide member 12 having inclined sides engaging similar walls defining an opening through the plate. The member 12 is fashioned on one end with a head 13 constituting a bearing and is provided on the opposite end with a bearing plate 14 secured thereto by a pair of screws as clearly illustrated in Figures 3 and 9 of the drawings.

A threaded shaft 15 extends through the plate 10 subjacent the member 12 and is threadedly connected to said plate for a purpose hereinafter set forth. One end of said shaft is rotatably journaled in the bearing plate 14 and has fixed thereto a finger wheel or operating knob 16. The opposite end of the shaft 15 is rotatably journaled within the bearing or head 13 and is fashioned with an enlarged portion constituting a hub 17 formed on a gear 18 disposed adjacent said bearing.

Rotatably journaled in the hub 17 is a stub shaft 19 fashioned on a gear 20 disposed adjacent the gear 18 and of a like diameter and number of teeth as the latter. The stub shaft 19 is fashioned with a circumferentially extending groove 21 receiving therein the end of a key screw 22 threaded in said hub 17 whereby to maintain said stub shaft 19 mounted therein against lateral displacement.

Subjacent the hub 17 the bearing is formed with a bore 23 in which is slidably and rotatably mounted a shaft 24, the latter having fixed thereto a pinion 25 adapted for selective meshing with one or both of the gears 18 and 20 as hereinafter set forth. Adjacent the pinion 25 and within the bore 23, the shaft 24 is provided with a ternary of circumferentially disposed grooves 26, 27 and 28 for selectively receiving a ball 29 mounted within an aperture 30 extending within the bearing 13 and in antiparallelism with respect to the axis of the shaft 24.

The outer end of the aperture 30 is closed by a threaded plug 31 and interposed between the plug 31 and the ball 29 is a spring 32 for maintaining the ball seated in one of the grooves, for instance the groove 28 as illustrated in Figure 5 of the drawings. The ball functions, when seated in one of said grooves, to preclude accidental lateral displacement of the shaft 24 relative to the gears 18 and 20. When the ball is selectively seated within the grooves 26, 27 and 28, the pinion 25 is in mesh with the gear 18, gears 18 and 20 and the gear 20 respectively.

The end of the shaft 24, adjacent the gear 20, is provided with a finger wheel 33 for effecting lateral displacement of the shaft with respect to the gears 18 and 20 and rotation of said shaft to effect rotation of the gears as desired. The opposite end of the shaft 24 is provided with a collar 34 which coacts with the pinion 25 to limit the axial movement of the shaft in either direction by engagement with the side walls of the bearing or head 13.

Secured to the outer end face of the gear 20, by means of screws 35, is an elongated plate or slide block 36 extending in a plane at right angles to the axis of the shaft 15. Adjustably mounted on the plate 36 is a yoke 37, the oppositely disposed inner side walls of which are inclined for sliding engagement with similar walls of the plate 36 whereby to maintain said yoke secured to said plate. The yoke has threaded therein the inner end of a set screw 38 which engages a face of the plate 36 to clamp the yoke thereto as clearly illustrated in Figure 5 of the drawings.

The head of the set screw 38 is disposed an apreciable distance from the yoke 37 and the shank of said screw, between the yoke 37 and its head, constitutes an eccentric pin for sliding movement within a vertically disposed elongated slot 39 formed in an elongated head 40 fashioned on one end of a reciprocating or connecting rod 41. The opposite end of the rod 41 is disposed through a head 42 and adjustably connected thereto by means of a set screw 43. The head 42 is formed on one end of a bar 43 disposed in parallelism with the member 12.

The bearing or head 13 is fashioned with an arm 44 having an angularly disposed portion 45 on which is formed a pair of right angularly disposed spaced rails 46 which slidably accommodate the head 42 and between which is disposed the rod 41. The outer ends of the rails 46 have secured thereto, by means of screws 47, a bearing plate 48 slidably accommodating the end of the rod 41 as clearly illustrated in Figures 3 and 6 of the drawings.

Lengthwise adjustably mounted upon the bar 43 are a pair of slides 49 and 50, the slide 49 being formed with a right angularly extending arm 51 and the slide 50 being formed with an arcuately shaped arm 52. Said arms 51 and 52 cooperate to secure therebetween a specimen frame or slide 53. Set screws 54 extend through the slides 49 and 50 and clamp the same in adjusted position to the bar 43. Loosening of one of said set screws 54 permits adjustment of the respective slide to position or remove the specimen frame 53 between the arms 51 and 52. In order to facilitate maintaining of said slide 53 therebetween during operation of the screws 54, a coil spring 55 is connected to the shank of each of said screws 54 whereby to urge the slides and their respective arms towards each other, and secure said slide 53 in position.

Obviously, by adjusting the yoke 37 with respect to the plate 36 the distance between the bar 43 and the member 12 may be varied as desired to locate the specimen frame 53 in a desired position with respect to the lens 7 of the microscope. Furthermore, by loosening the set screws 54 the arms 51 and 52 together with their respective slides may be longitudinally operated with respect to the bar 43 for a quick inspection of the specimen or specimens contained on the specimen slide 53. However, when it is desired to slowly move the specimen frame with respect to the lens 7 and in parallelism with the member 12, the pinion 25 is disposed in mesh with the gear 18 and either the wheel 16 or 33 rotated to effect rotation of the threaded shaft 15 whereby to effect longitudinal movement of the member 12 with respect to the plate 10 and microscope 5.

When it is desired to move the specimen frame both longitudinally and transversely with respect to the plate 10, the pinion 25 is disposed in mesh with both of the gears 18 and 20, thereby imparting a reciprocating movement to the head 42 through the medium of the rod 41 and eccentric pin 38 upon operation of the shaft 15 in the aforesaid manner. Obviously, by adjusting the yoke 37 with respect to the plate 36 any desired length of transverse movement may be imparted to the bar 43. It is also to be noted that by this adjustment it is not necessary, as in the instances of many microscopes, to move the frame 53 a greater transverse distance than a distance equal to that of the width of the specimen contained thereon, thereby reducing to a minimum the time required for a complete scanning of the specimen. Furthermore, a reverse operation of the shaft 15 permits a rescanning of the specimen of the same area. However, before reversing the operation of the shaft 15, the pinion 25 may be meshed with the gear 20 and the shaft 15 slightly rotated and the pinion 25 remeshed with the gear 18, thereby varying the path of movement with respect to the lens 7 on the reverse operation of the shaft 15.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claims.

What I claim is:

1. In a microscope having a support table, a carriage slidably mounted on the table, a rotary screw shaft carried by the carriage operative to adjust the latter longitudinally of the table, a reciprocating rod mounted on the carriage and extending transversely of the table, specimen holding means attached to the said rod, a drive gear fixed on the screw shaft, a companion gear rotatably supported on the shaft having connection with the rod for reciprocating the same upon rotation of the companion gear, and a pinion selectively engageable with the said gears for independent or simultaneous operation of the screw shaft and reciprocating rod.

2. In a microscope, a carriage adjustably mounted thereon, a slide member adjustably mounted on the carriage, a bar attached to and projecting from the slide member, a pair of specimen engaging arms mounted to slide longitudinally on the bar, set screws carried by the said arms for releasably fastening the same in adjusted position on the bar, and means connected with the said arms and adapted to yieldingly urge the said arms toward one another for clamping a specimen holder between the arms.

3. In a microscope having a support table, an attaching element secured to the table, a carriage slidably connected with the said attaching element, a rotary screw shaft mounted on the carriage and engaging the attaching element for adjusting the carriage longitudinally of the table, a gear fixed to the said shaft, a companion gear rotatably supported on the shaft adjacent the fixed gear, a reciprocatory rod mounted on the carriage and extending transversely of the table, a slotted head on one end of the said rod, a pin carried eccentrically by a face of the said companion gear extending through the slot for reciprocating the said rod upon rotation of the gear, an axially slidable pinion shaft journalled on the carriage, a pinion fixed on the said pinion shaft selectively engageable with either or both of the said gears, means for releasably holding the pinion shaft in axially adjusted position, and a specimen supporting member adjustably connected to the said reciprocatory rod.

VICTOR M. POSADA.